United States Patent
Shin et al.

(10) Patent No.: US 7,646,461 B2
(45) Date of Patent: Jan. 12, 2010

(54) LIQUID CRYSTAL DISPLAY DEVICE WITH AT LEAST TWO CONTACT HOLES IN THE PAD REGION HAVING SIDEWALLS WITH DIFFERING SLOPES

(75) Inventors: Chul Sang Shin, Cheonan-shi (KR); Eun Hong Kim, Taegu-kwangyokshi (KR)

(73) Assignee: LG. Display Co., Ltd., Seoul (KR)

( * ) Notice: Subject to any disclaimer, the term of this patent is extended or adjusted under 35 U.S.C. 154(b) by 602 days.

(21) Appl. No.: 11/136,321

(22) Filed: May 24, 2005

(65) Prior Publication Data

US 2005/0264747 A1    Dec. 1, 2005

(30) Foreign Application Priority Data

May 24, 2004    (KR) ............. 10-2004-0036796

(51) Int. Cl.
*G02F 1/1333* (2006.01)
*G02F 1/1345* (2006.01)

(52) U.S. Cl. ............... 349/138; 349/149; 349/151; 349/152

(58) Field of Classification Search ......... 349/149–152, 349/138
See application file for complete search history.

(56) References Cited

U.S. PATENT DOCUMENTS

| | | | |
|---|---|---|---|
| 2002/0008819 A1* | 1/2002 | Yoshida | 349/138 |
| 2003/0076452 A1* | 4/2003 | Kim et al. | 349/43 |
| 2003/0086036 A1* | 5/2003 | Yang et al. | 349/113 |
| 2003/0122989 A1* | 7/2003 | Park et al. | 349/43 |
| 2003/0202133 A1* | 10/2003 | Yun | 349/43 |
| 2005/0110019 A1* | 5/2005 | Ryu et al. | 257/72 |

* cited by examiner

*Primary Examiner*—David Nelms
*Assistant Examiner*—Jessica M Merlin
(74) *Attorney, Agent, or Firm*—Brinks Hofer Gilson & Lione

(57) ABSTRACT

A liquid crystal display device and a method for manufacturing the same are disclosed which are capable of preventing occurrence of contact errors between pads of gate or data lines and pad electrodes. The liquid crystal display device includes a signal line and a signal line pad arranged in one direction, an insulating film formed on the signal line and the signal line pad, the insulating film including at least one contact hole, through which a predetermined portion of the signal line pad is exposed, and a pad electrode formed on the insulating film, and electrically connected with the signal line pad via the at least one contact hole. The insulating film includes inner side walls defining the at least one contact hole, and at least one of the inner side walls has a slope gentler than a slope of the remaining inner side walls.

20 Claims, 15 Drawing Sheets

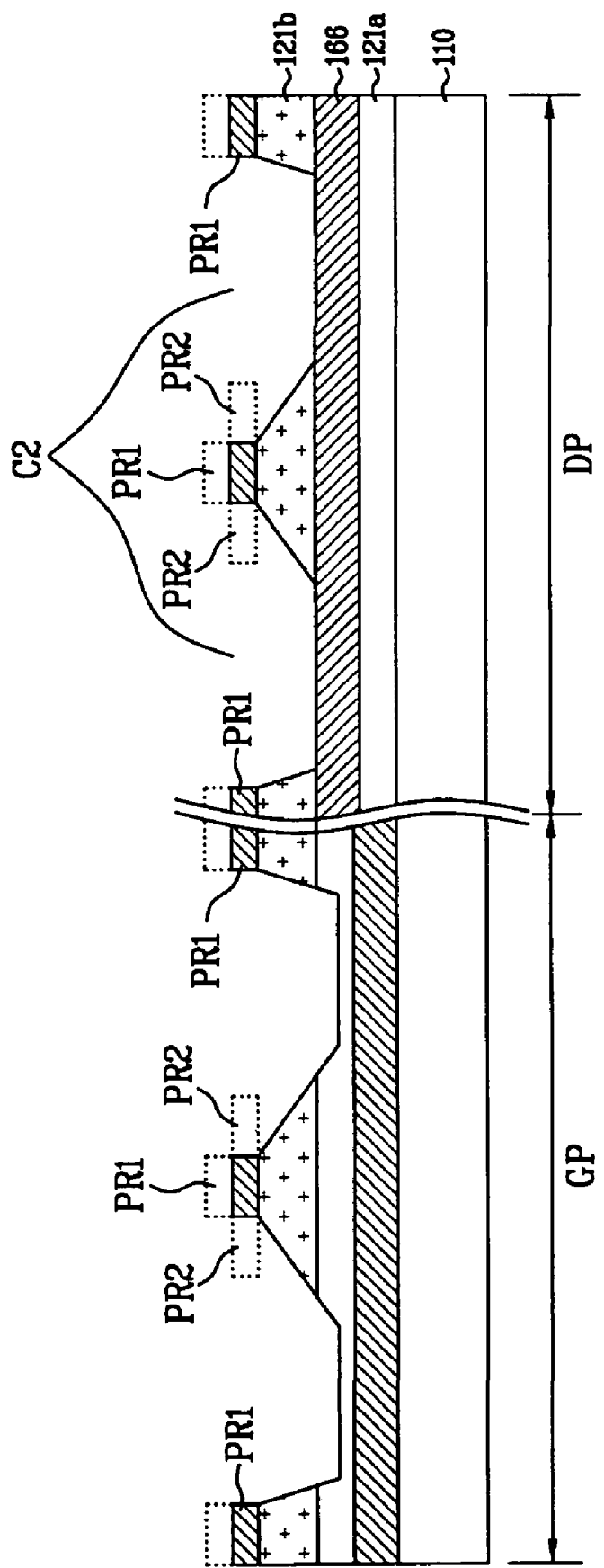

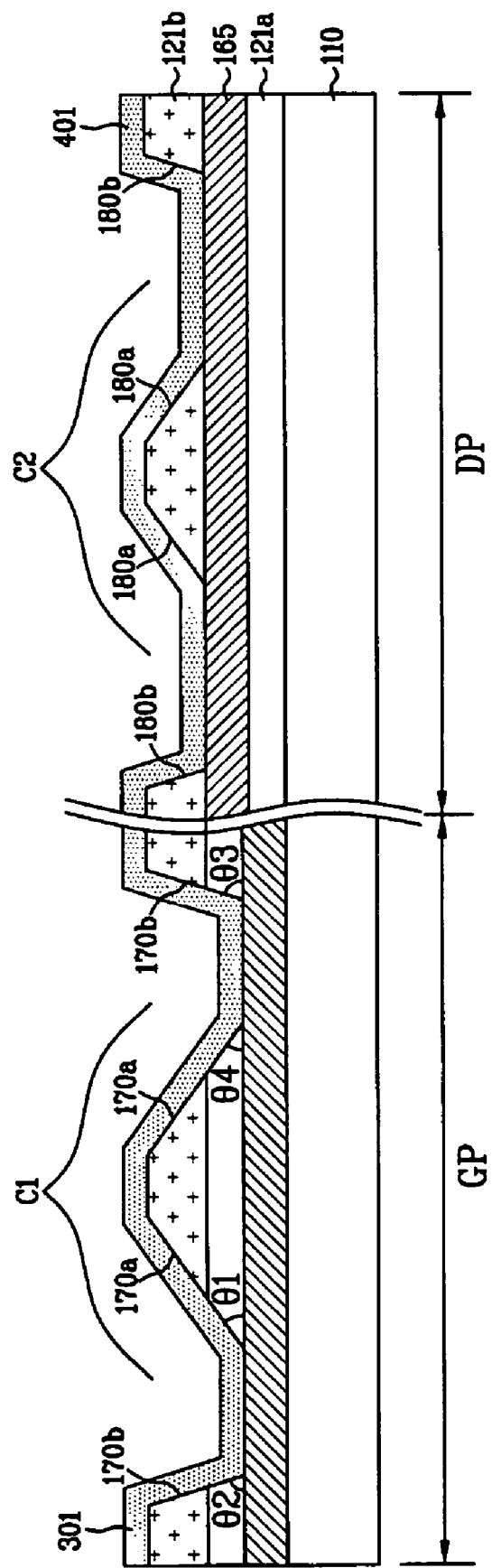

LIQUID CRYSTAL DISPLAY DEVICE WITH AT LEAST TWO CONTACT HOLES IN THE PAD REGION HAVING SIDEWALLS WITH DIFFERING SLOPES

CLAIM FOR PRIORITY

This application claims the benefit of priority to Korean Patent Application No. 2004-36796, filed on May 24, 2004 which is hereby incorporated by reference as if fully set forth herein.

FIELD OF THE INVENTION

The present invention relates to a liquid crystal display device, and more particularly, to a liquid crystal display device and a method for manufacturing the same, which are capable of preventing occurrence of contact errors between pads of gate or data lines and pad electrodes.

DISCUSSION OF THE RELATED ART

Recently, research of flat panel display devices is exceedingly active. Among the various types of flat panel display devices, liquid crystal display (LCD) devices, field emission display (FED) devices, electro-luminescent display (ELD) devices, plasma display panels (PDPs) and the like have been highlighted.

In particular, LCDs have been used as a substitute for cathode ray tubes (CRTs) in association with mobile image display devices because LCDs have advantages of superior picture quality, lightness, thinness, and low power consumption. Thus, LCDs are currently most widely used. Various applications of LCDs are being developed in association with not only mobile image display devices such as monitors of notebook computers, but also monitors of TVs to receive and display broadcasting signals, and monitors of laptop computers.

Although diverse technical development has been achieved to enable LCDs to be used as image display devices in various fields, as mentioned above, the task to achieve an enhancement in picture quality required in image display devices is considerably opposed to the above-mentioned advantages of LCDs.

Therefore, success of application of LCDs to diverse image display devices depends on whether or not the LCDs can realize desired high picture quality including high resolution, high brightness, large display area, and the like, while maintaining desired characteristics of lightness, thinness, and low power consumption.

Such an LCD mainly includes a liquid crystal panel for displaying an image, and a driver for applying a drive signal to the liquid crystal panel. The liquid crystal panel includes first and second substrates joined together such that a space is defined between the first and second substrates, and a liquid crystal layer constituted by a liquid crystal sealed in the space between the first and second substrate.

The first substrate (TFT array substrate) includes a plurality of gate lines arranged in one direction while being spaced apart from one another, and a plurality of data lines arranged in a direction perpendicular to the gate lines while being spaced apart from one another. The first substrate also includes a plurality of pixel electrodes arranged in the form of a matrix array at respective pixel regions each defined by an intersection between each gate line and each data line, and a plurality of thin film transistors (TFTs), each of which is switched on by a signal on an associated one of the gate lines, and transmits a signal on an associated one of the data lines to an associated one of the pixel electrodes.

The second substrate (color filter substrate) includes a black matrix layer for blocking incidence of light to a region other than the pixel regions, R, G, B color filter layers for reproducing color tones, and a common electrode for reproducing an image.

The first and second substrates are joined by a sealant under the condition in which a certain space is maintained between the first and second substrates by spacers. Liquid crystal is sealed in the space between the first and second substrates.

The liquid crystal panel having the above-mentioned configuration may be divided into a display area, on which an image is displayed, and a non-display area provided with pads, to which various signals required to display the image, for example, control signals, image signals, and drive voltage, are applied.

The display area in the first substrate of the liquid crystal panel includes a plurality of pixel regions each defined by an intersection between each gate line and each data line, as mentioned above. On the other hand, the non-display area in the first substrate is divided into a gate pad area, on which terminals of the gate lines extending from the display area are densely arranged, and a data pad area, on which terminals of the data lines extending from the display area are densely arranged.

Hereinafter, the conventional gate pad area will be described in detail with reference to FIGS. 1 and 2. FIG. 1 is a plan view illustrating a plurality of gate pads formed on the conventional gate pad area. FIG. 2 is a cross-sectional view taken along the line I-I of FIG. 1.

As shown in FIGS. 1 and 2, the conventional gate pad area includes gate pads 16 extending from respective gate lines, and an insulating film 21 formed over the entire surface of a substrate 10, which includes the gate lines and gate pads 16. The insulating film 21 has a plurality of contact holes C, through which predetermined portions of the gate pads 16 are exposed, respectively. The gate pad area also includes a plurality of gate pad electrodes 15 formed on the insulating film 21, and electrically connected with the gate pads 16 via the contact holes C, respectively. The insulating film 21 consists of a gate insulating film 21a, and a protective layer 21b.

Although not shown, each gate pad electrode 15 is electrically connected with one side of an associated one of tape carrier packages (TCPs), on which gate drive ICs are mounted, respectively. The other side of each TCP is electrically connected with a PCB substrate, on which a controller for providing a gate drive pulse to drive the gate lines is mounted.

The gate drive pulse output from the controller is applied to each TCP which, in turn, adjusts the timing of the gate drive pulse. At the adjusted timing, the gate drive pulse is applied to the gate pads 16 via the gate pad electrodes 15. Thus, each gate line receives the gate drive pulse via the gate pad 16 of the gate line.

Each TCP is not connected with one gate pad electrode 15, but is connected with a group of gate pad electrodes 15. Prior to the connection of the gate pad electrodes 15 to the TCPs, a test is conducted to check whether or not the gate drive pulse is normally applied to the gate lines. In the test, the gate drive pulse is applied to each gate line to check whether or not the gate drive pulse is normally transmitted to each gate line.

Meanwhile, the formation of the gate pads 16 and gate pad electrodes 15 is achieved using a photolithography process. The developer used in the photolithography process may penetrate the gate pad electrodes 15 without being completely removed after the photolithography process. In this case, cracks may be formed at the gate pad electrodes 15.

The cracks formed at the gate pad electrodes 15 grow gradually, thereby breaking the gate pad electrodes 15. In particular, such a phenomenon occurs remarkably at portions of the gate pad electrodes 15 formed along inner side walls 70 of the insulating film 21, which define the contact holes C. This will be described in detail. Each gate pad electrode 15 has portions formed along the inner side walls 70 of the insulating film 21 defining the contact holes C, so that the gate pad electrode 15 is connected with an associated one of the gate pads 16 formed beneath the insulating film 21. However, the portions of the gate pad electrode 15 are sharply bent at regions A because the inner side walls 70 of the insulating film 21 have a sharp slope. For this reason, when the developer penetrates the gate pad electrode 15, cracks may easily be formed at the bent portions A of the gate pad electrode 15. The cracks grow gradually along the portions of the gate pad electrode 15 on the inner side walls 70, thereby breaking the gate pad electrode 15. As a result, the gate pad electrode 15 is divided into a first gate pad electrode portion 15a and a second gate pad electrode portion 15b due to the growth of cracks, as shown in FIG. 2.

When a gate drive pulse is applied to one side of the broken gate pad electrode 15 in the testing process, the application of gate drive pulse is normally achieved at the first gate pad electrode portion 15a. However, the gate drive pulse cannot be applied to the second gate pad electrode portion 15b connected to the gate pad 16. For this reason, the gate drive pulse cannot be supplied to the gate line corresponding to the gate pad 16.

Of course, this phenomenon occurs only when the gate pad electrode 15 is broken at all contact holes C associated therewith. Where the gate pad electrode 15 is broken only at a part of the associated contact holes C, the gate drive pulse can be applied to the gate line.

However, when the gate pad electrode 15 is connected with the gate pad 16 only at a part of the associated contact holes C, an increase in resistance occurs because the contact area between the gate pad electrode 15 and the gate pad 16 is reduced. Due to the increased resistance, the gate drive pulse supplied to the gate line is distorted.

Thus, when the gate pad electrode 15 is broken, the gate drive pulse cannot be applied to the gate line, or is abnormally applied to the gate line. For this reason, conventional liquid crystal display devices have a problem in that it is difficult to accurately check breakage of gate lines.

SUMMARY OF THE INVENTION

By way of introduction only, a liquid crystal display device and a method for manufacturing the same are provided, in which at least one of the inner side walls of an insulating film defining a contact hole has a slope gentler than that of another of the inner side walls so that growth of cracks is prevented at the at least one inner side wall. This mitigates breakage of gate pad electrodes and data pad electrodes.

In one aspect, a liquid crystal display device comprises a signal line and a signal line pad arranged in one direction. An insulating film is formed on the signal line and the signal line pad. The insulating film includes at least one contact hole through which a predetermined portion of the signal line pad is exposed. A pad electrode is formed on the insulating film and electrically connects with the signal line pad via the at least one contact hole. The insulating film includes inner side walls defining the at least one contact hole. At least one of the inner side walls has a slope gentler than a slope of at least one of the remaining inner side walls.

In another aspect of the present invention, a liquid crystal display device comprises a gate line and a gate pad formed on a substrate. A gate insulating film is formed on the substrate including the gate line and the gate pad. A data line and a data pad are formed on the gate insulating film. A protective film is formed over a surface of the substrate including the data line and the data pad. At least one first contact hole and at least one second contact hole are formed at at least one of the gate insulating film and the protective film to expose predetermined portions of the gate and data pads, respectively. A first pad electrode and a second pad electrode are connected to the gate and data pads via the at least one first contact hole and the at least one second contact hole, respectively. Each of the at least one first contact hole and the at least one second contact hole includes inner side walls. At least one of the inner side walls has a slope gentler than a slope of at least one of the remaining side walls.

In another aspect of the present invention, a method for manufacturing a liquid crystal display device comprises: forming a plurality of signal lines and a plurality of pads on a substrate; forming an insulating film over a surface of the substrate including the signal lines and the pads; forming at least one contact hole to expose a predetermined portion of each of the pads such that at least one of inner side walls of the insulating film defining the contact hole has a slope gentler than a slope of at least one of the remaining inner side walls; and forming a pad electrode to be connected with the pad via the at least one contact hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 10A to 10G are sectional views respectively illustrating sequential processes of a liquid crystal display device manufacturing method according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
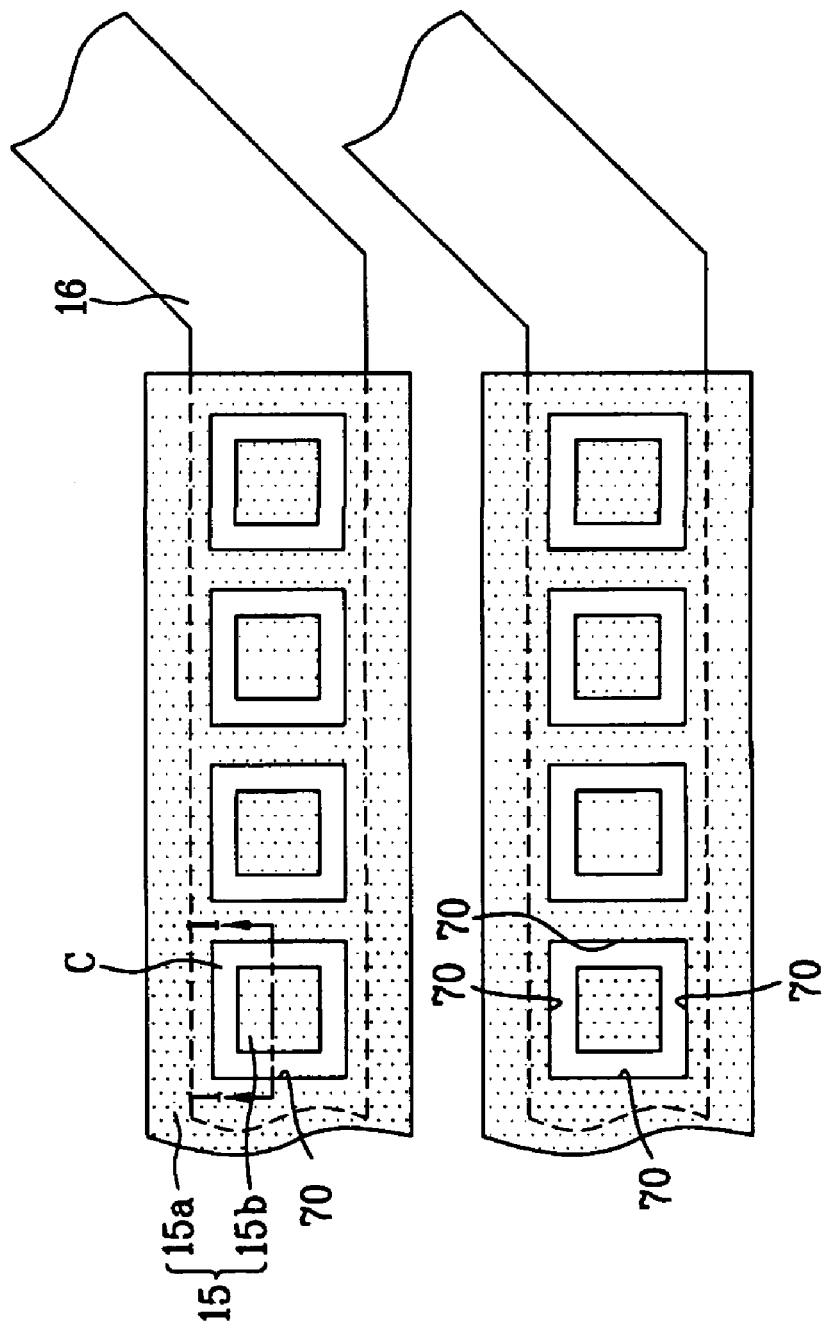
FIG. 1 is a plan view illustrating a plurality of gate pads formed on the conventional gate pad area.
Figure 2:
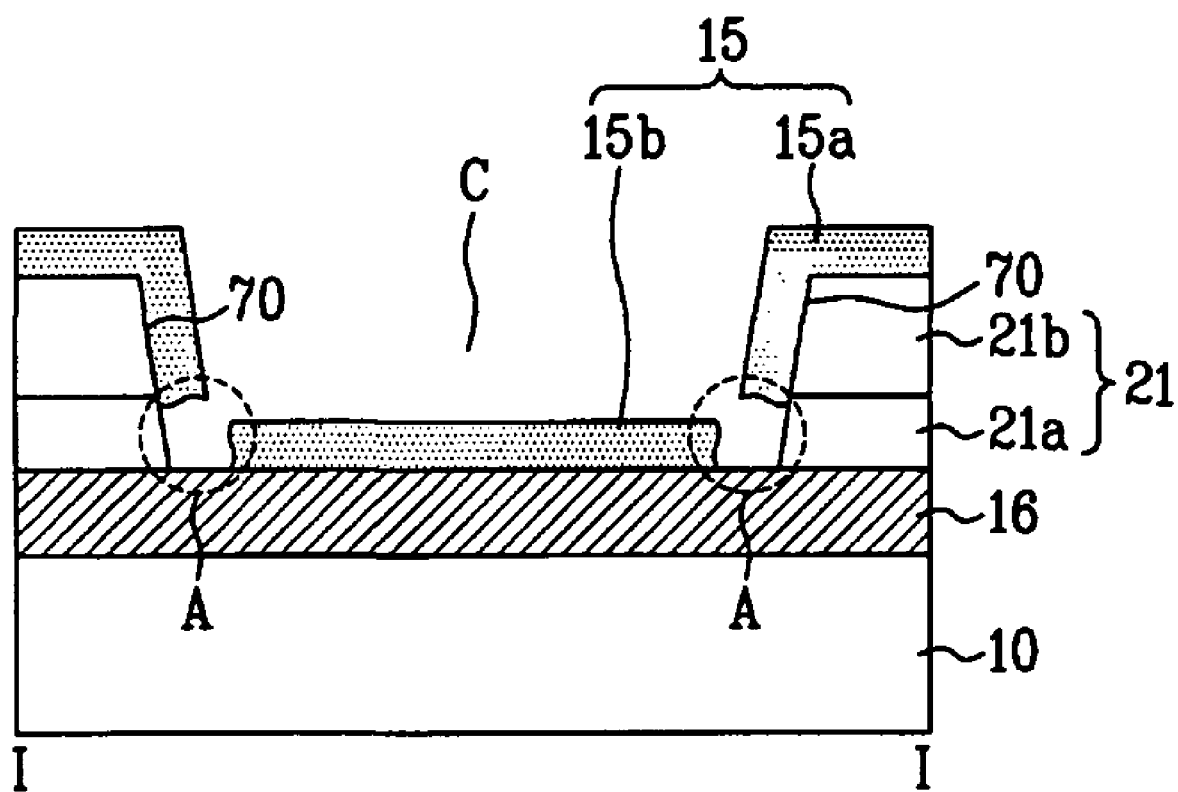
FIG. 2 is a cross-sectional view taken along the line I-I of FIG. 1.
Figure 3:
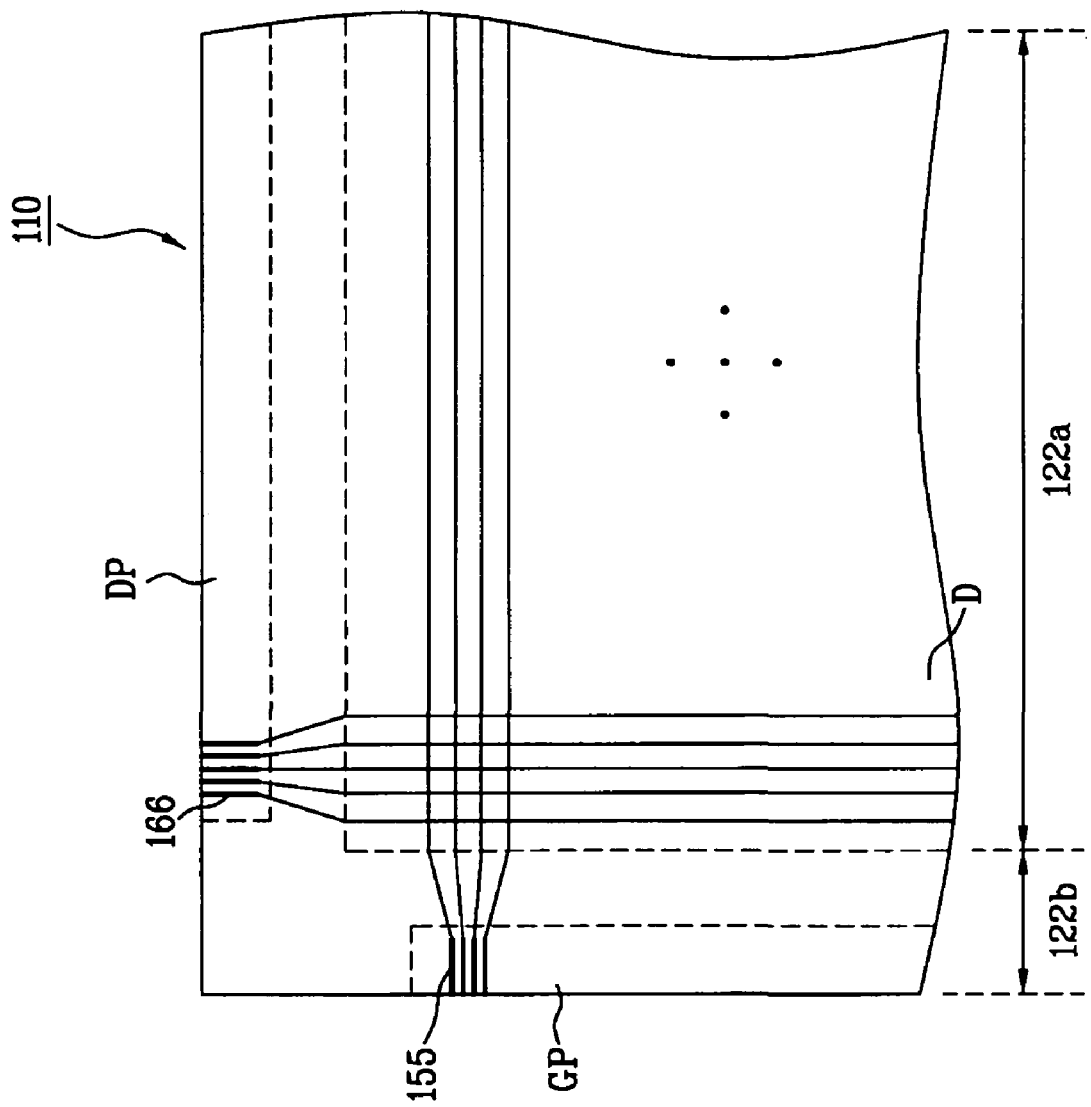
FIG. 3 is a schematic view illustrating a configuration of a first substrate included in a liquid crystal display device according to a first embodiment of the present invention.
Figure 4:
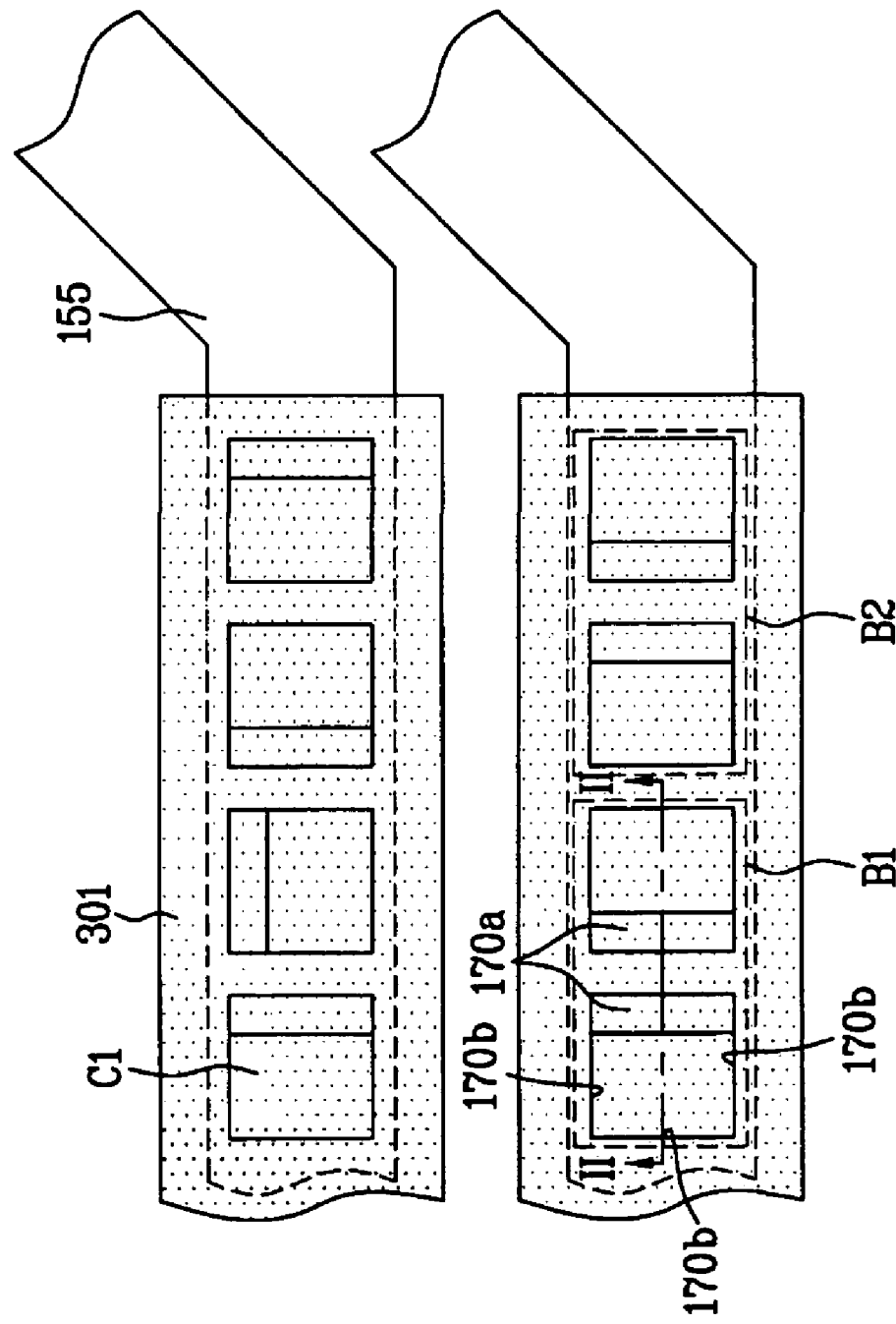
FIG. 4 is an enlarged view illustrating parts of gate pads shown in FIG. 3.
Figure 5:
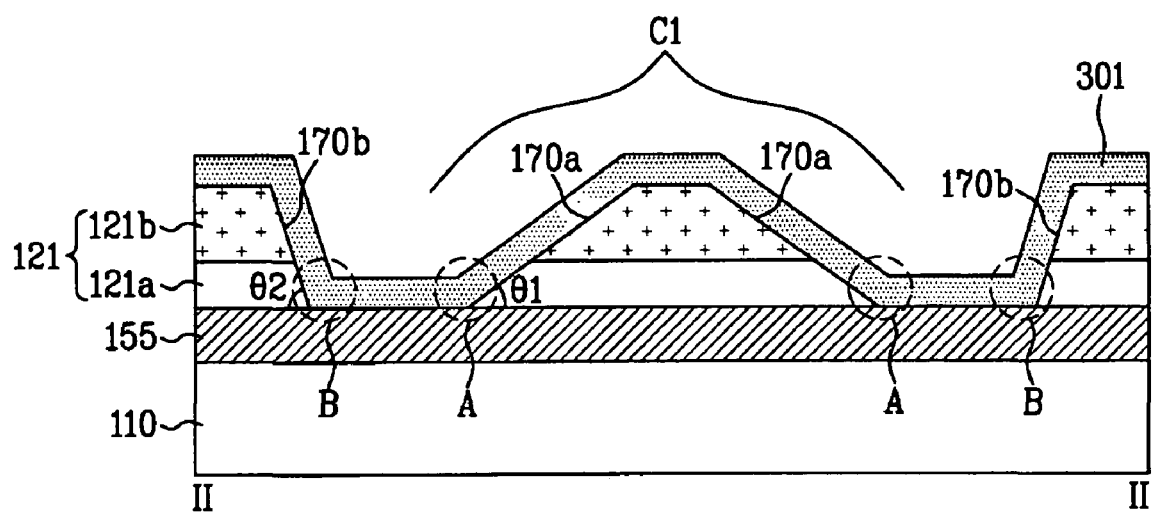
FIG. 5 is a cross-sectional view taken along the line II-II of FIG. 4.
Figure 6:
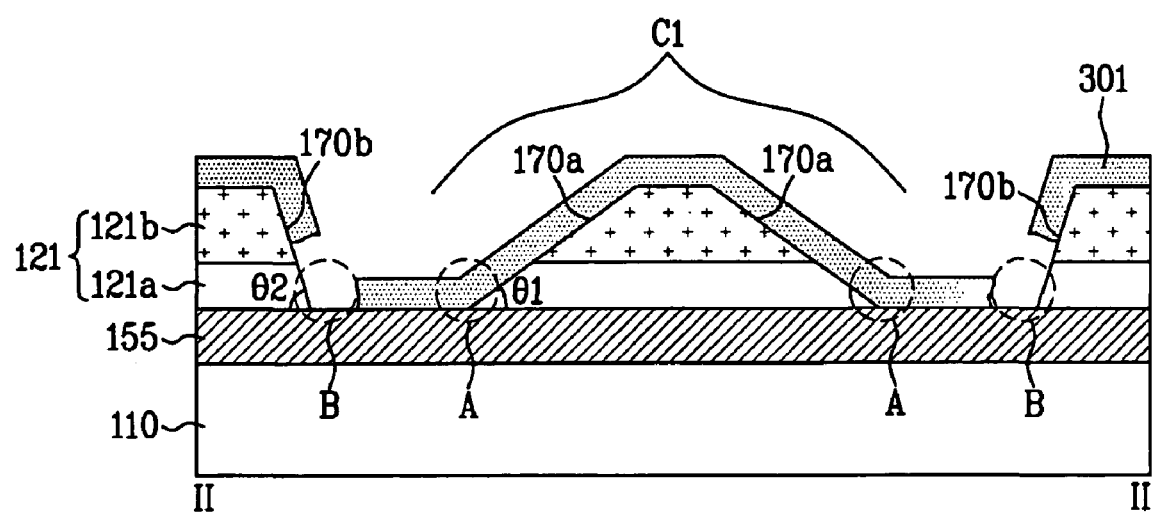
FIG. 6 is a sectional view explaining breakage of a gate pad electrode caused by cracks.
Figure 7:
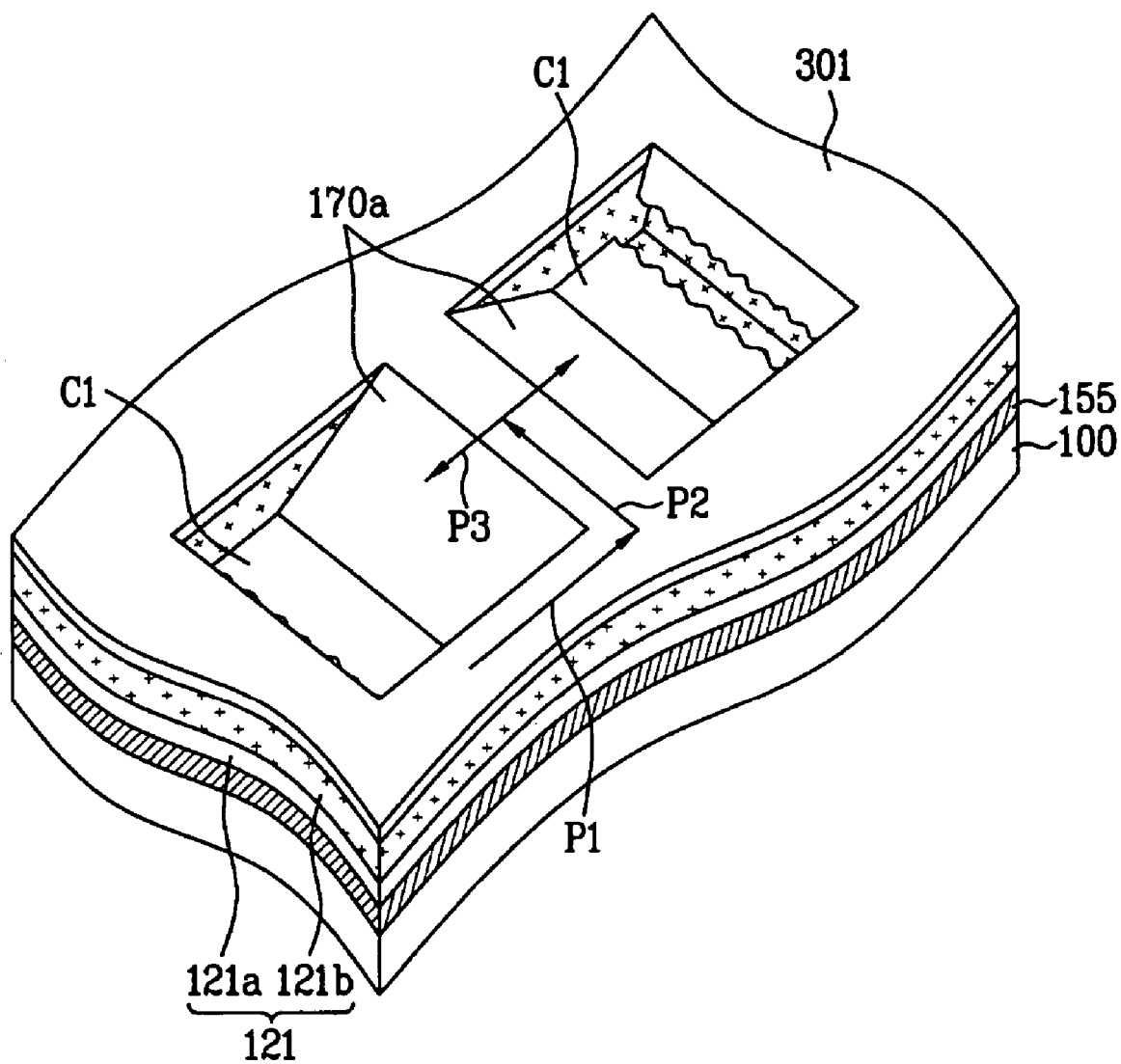
FIG. 7 is a sectional view explaining breakage of a gate pad electrode caused by cracks.
Figure 8:
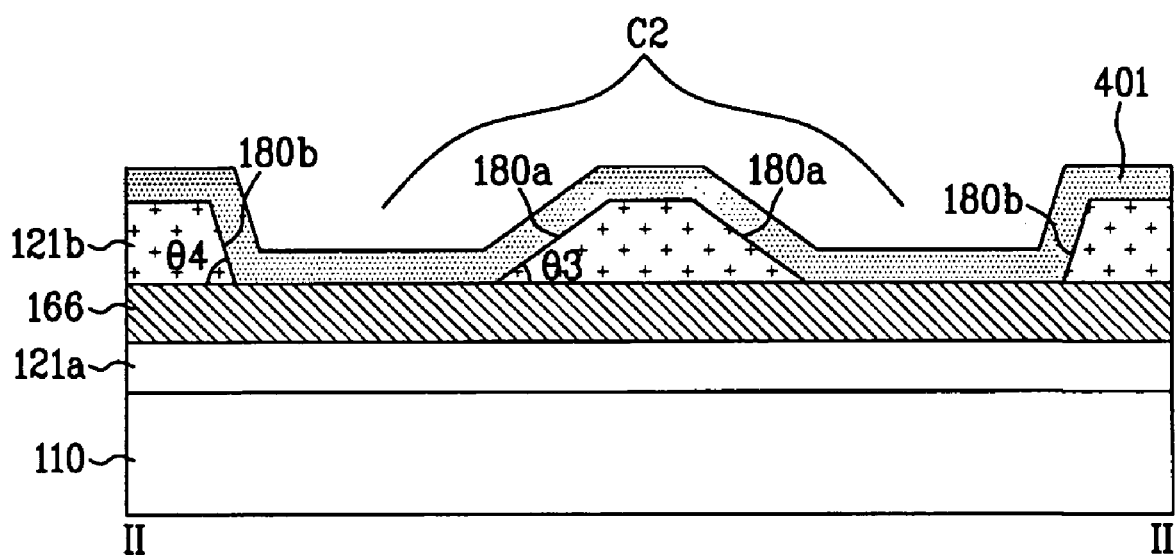
FIG. 8 is a sectional view illustrating a data pad area.

FIG. 3 is a schematic view illustrating a configuration of a first substrate included in a liquid crystal display device according to a first embodiment of the present invention. FIG. 4 is an enlarged view illustrating parts of gate pads shown in FIG. 3. FIG. 5 is a cross-sectional view taken along the line II-II of FIG. 4. FIGS. 6 and 7 are a sectional view and a perspective view respectively explaining breakage of a gate pad electrode caused by cracks. FIG. 8 is a sectional view illustrating a data pad area.

As shown in FIGS. 3 to 5, the liquid crystal display device according to the first embodiment of the present invention is divided into a display area 122a and a non-display area 122b. The liquid crystal display device includes a substrate 110. The liquid crystal display device also includes a plurality of gate lines G and a plurality of data lines D, which are formed on the substrate 110 in the display area 122a such that the gate lines G and data lines D intersect perpendicularly with each other, and gate pads 155 formed on the substrate 110 in a gate pad area GP of the non-display area 122b. The gate pads 155 extend from respective gate lines G. The liquid crystal display device further includes an insulating film 121 formed over the entire surface of the substrate 110 including the gate lines G, and provided with a plurality of gate contact holes C1, through which predetermined portions of the gate pads 155 are exposed, respectively. The liquid crystal display device further includes gate pad electrodes 301 electrically connected with the gate pads 155 via the gate contact holes C1, respectively. The insulating film 121 consists of a gate insulating film 121a, and a protective layer 121b.

The liquid crystal display device also includes pixel electrodes arranged at respective pixel regions each defined by an intersection between each gate line G and each data line D, and thin film transistors (TFTs) each arranged at the intersection between each gate line G and each data line D. Each TFT is turned on by a signal on an associated one of the gate lines G, and transmits a signal on an associated one of the data lines D to an associated one of the pixel electrodes.

Each gate contact hole C1 has a square shape. In order to define each square gate contact hole C1, the insulating film 121 has inner side walls 170a and 170b. In accordance with the present invention, at least one of the inner side walls 170a and 170b of the insulating film 121 defining each gate contact hole C1 has a slope gentler than that of the remaining ones. Preferably, as shown in FIG. 5, the inner side walls 170a of the insulating film 121, which are arranged between adjacent gate contact holes C1, have a slope $\theta 1$ gentler than the slope of the remaining inner side walls 170b of the insulating film 121, that is, a slope $\theta 2$.

That is, when the gate contact holes C1, which are aligned together, are divided into a plurality of blocks B1, B2 ... each including a pair of adjacent gate contact holes C1, it is preferred that the slope $\theta 1$ of the inner side walls 170a of the insulating film 121, which are arranged between the two gate contact holes C1 in each of the blocks B1, B2 ..., be gentler than the slope $\theta 2$ of the remaining inner side walls 170b of the insulating film 121 respectively defining the two gate contact holes C1.

In the following description, the inner side walls 170a of the insulating film 121, which are arranged between the two gate contact holes C1 in each of the blocks B1, B2 ..., will be referred to as "first side walls", and the remaining inner side walls 170b of the insulating film 121 respectively defining the two gate contact holes C1 will be referred to as "second side walls". When the slope $\theta 1$ of the first inner side walls 170a is gentler than the slope $\theta 2$ of the second inner side walls 170b, as described above, the portions of the gate pad electrode 301, which extend along the associated first inner side walls 170a and contact the gate pad 155, are bent at an angle gentler than that of the portions of the gate pad electrode 301, which extend along the associated second inner side walls 170b and contact the gate pad 155.

In this case, accordingly, as shown in FIGS. 6 and 7, the portions of the gate pad electrode 301, which extend along the associated second inner side walls 170b and are bent at regions B, still have a high possibility of crack formation. However, the portions of the gate pad electrode 301, which extend along the associated first inner side walls 170a and are bent at regions A, have a reduced possibility of crack formation.

When cracks are formed at the portions of the gate pad electrode 301 on the second inner side walls 170b, the portions of the gate pad electrode 301 on the second inner side walls 170b may be disconnected from the gate pad 155. However, the portions of the gate pad electrode 301 on the first inner side walls 170a are in contact with the gate pad 155 because no crack is formed at the portions of the gate pad electrode 301 on the first inner side walls 170a.

Thus, although the portions of the gate pad electrode 301 on the second inner side walls 170b may not transmit a gate drive pulse to the gate pad 155, the portions of the gate pad electrode 301 on the first inner side walls 170a can transmit the gate drive pulse to the gate pad 155. That is, as shown in FIG. 7, the gate drive pulse is transmitted to portions of the gate pad 155 respectively corresponding to the adjacent gate contact holes C1 via a path, which extends along the portion of the gate pad electrode 301 formed on the insulating film 121 around the gate contact hole C1, a path P2, which extends along the portion of the gate pad electrode 301 formed on the insulating film 121 between the adjacent gate contact holes C1, and a path P3, which extends along the portions of the gate pad electrode 301 formed on the first inner walls 170a.

Meanwhile, as shown in FIG. 8, data pads 166 are formed on the substrate 110 in a data pad area DP of the non-display area 122b. The data pads 166 extend from respective data lines D. In the data pad area DP, the gate insulating film 121a and protective layer 121b are arranged on and beneath the data pads 166, respectively.

A plurality of data contact holes C2 are formed at the protective layer 121b. Predetermined portions of the data pads 166 are exposed through the data contact holes C2, respectively. Each data contact hole C2 has a square shape. Data pad electrodes 401 are formed on the protective layer 121b such that the data pad electrodes 401 are electrically connected with the data pads 166 via the data contact holes C2, respectively.

In order to define each square data contact hole C2, the protective layer 121b has inner side walls 180a and 180b. In accordance with the present invention, at least one of the inner side walls 180a and 180b of the protective layer 121b defining each data contact hole C2 has a slope gentler than that of the remaining ones. Preferably, as shown in FIG. 8, the inner side walls 180a of the protective layer 121b, which are arranged between adjacent data contact holes C2, have a slope $\theta 3$ gentler than the slope of the remaining inner side walls 180b of the protective layer 121b, that is, a slope $\theta 4$.

That is, when the data contact holes C2, which are aligned together, are divided into a plurality of blocks each including a pair of adjacent data contact holes C2, it is preferred that the slope θ3 of the inner side walls 180a of the protective layer 121b, which are arranged between the two data contact holes C2 in each of the blocks be gentler than the slope θ4 of the remaining inner side walls 180b of the protective layer 121b respectively defining the two data contact holes C2.

In the following description, the inner side walls 180a of the protective layer 121b, which are arranged between the two data contact holes C2 in each of the blocks, will be referred to as "third side walls", and the remaining inner side walls 180b of the protective layer 121b respectively defining the two data contact holes C2 will be referred to as "fourth side walls". When the slope θ3 of the third inner side walls 180a is gentler than the slope θ4 of the fourth inner side walls 180b, as described above, the portions of the data pad electrode 401, which extend along the associated third inner side walls 180a and contact the data pad 166, are bent at an angle gentler than that of the portions of the data pad electrode 401, which extend along the associated fourth inner side walls 180b and contact the data pad 166.

In this case, accordingly, although not shown, the portions of the data pad electrode 401, which extend along the associated fourth inner side walls 180b, still have a high possibility of crack formation. However, the portions of the data pad electrode 401, which extend along the associated third inner side walls 180a, have a reduced possibility of crack formation.

Figure 9:
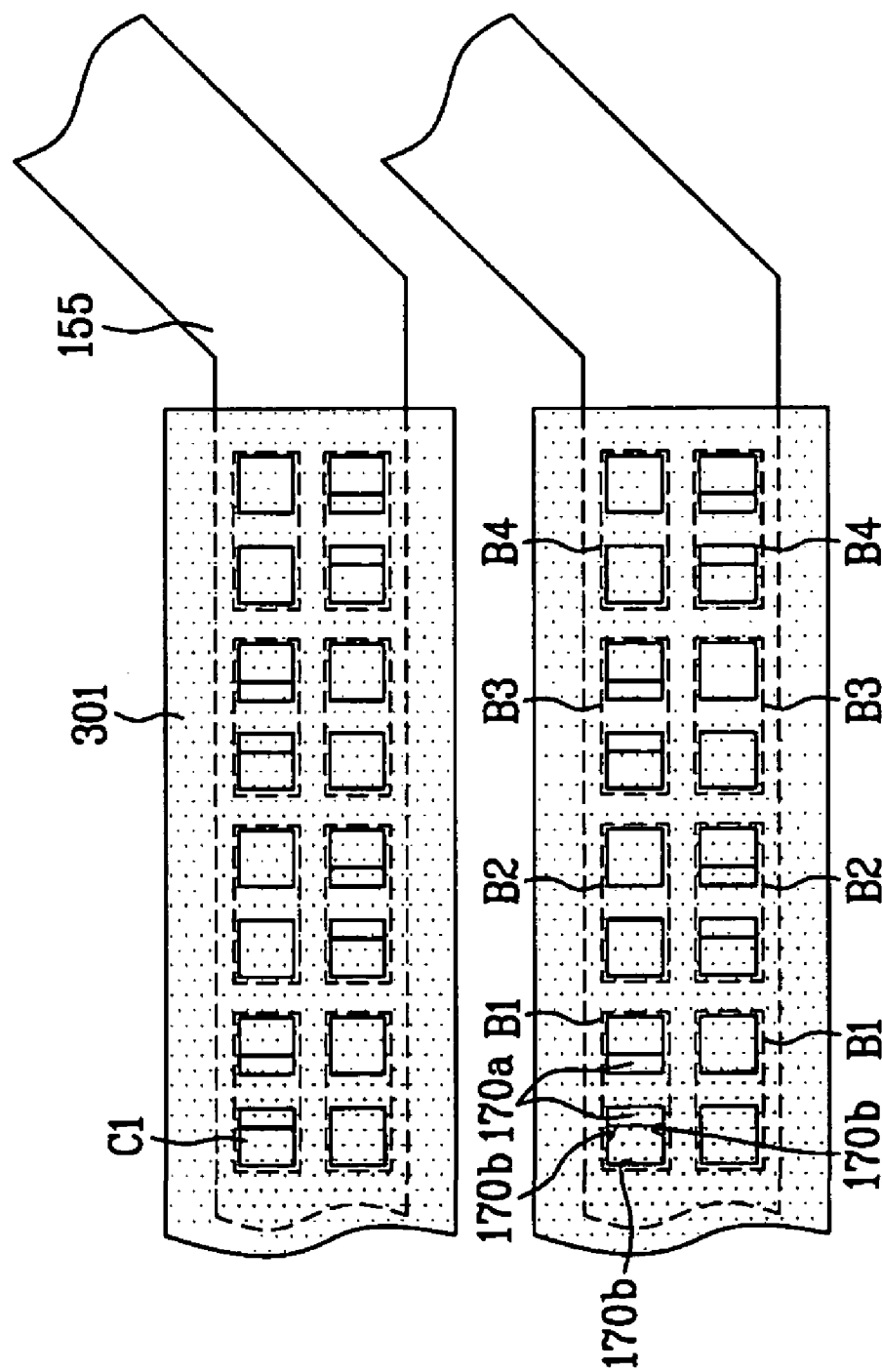
FIG. 9 is a plan view illustrating a gate pad area in a liquid crystal display according to a second embodiment of the present invention.

Meanwhile, the gate contact holes C1 may be aligned along two or more lines on the insulating film 121 in the gate pad area GP. FIG. 9 is a plan view illustrating a gate pad area in a liquid crystal display according to a second embodiment of the present invention. In accordance with the second embodiment, a plurality of gate contact holes C1 are arranged on the insulating film 121 along a plurality of lines, for example, first and second lines in the case of FIG. 9.

Hereinafter, the gate contact holes C1 of the first and second lines will be described in conjunction with the case in which the gate contact holes C1 are grouped into blocks. In the following description, it is assumed that the gate contact holes C1, which are aligned along the first line, are divided into a plurality of blocks B1, B2 . . . , Bn each including a pair of adjacent gate contact holes C1, and the ordinal numbers of the blocks are incremented from the left to the right in the order of a first block B1, a second block B2, a third block B3 , , , , and an n-th block Bn. Also, it is assumed that the gate contact holes C1, which are aligned along the second line, are divided into a plurality of blocks B1, B2, . . . , Bn each including a pair of adjacent gate contact holes C1, and the ordinal numbers of the blocks are incremented from the left to the right in the order of a first block B1, a second block B2, a third block B3 , , , , and an n-th block Bn.

Each gate contact hole C1 in each of the blocks B1, B2 , , , Bn in each of the first and second lines is defined by first and second inner side walls 170a and 170b, which are defined as in the first embodiment.

In this case, preferably, the first inner side walls 170a in the odd-numbered blocks B1, B3, B5 , , , Bn−1 of the first line and the first inner side walls 170a in the even-numbered blocks B2, B4, B6 , , , Bn of the second line have a slope gentler than that of the remaining second inner side walls 170b in the blocks.

That is, it is preferred that the first inner side walls 170a in the odd-numbered blocks B1, B3, B5 , , , Bn−1 of the odd-numbered lines have a slope gentler than that of the remaining second inner side walls 170b in the blocks. It is also preferred that the first inner side walls 170a in the even-numbered blocks B2, B4, B6 , , , Bn of the even-numbered lines have a slope gentler than that of the remaining second inner side walls 170b in the blocks.

Also, the first inner side walls 170a in the even-numbered blocks of the odd-numbered lines may have a slope gentler than that of the remaining second inner side walls 170b in the blocks. Similarly, the first inner side walls 170a in the odd-numbered blocks of the even-numbered lines may have a slope gentler than that of the remaining second inner side walls 170b in the blocks.

Meanwhile, although not shown, where a plurality of data contact holes C2 are arranged along a plurality of lines on the protective layer 121b in the data pad area DP, it is preferred that, when the data contact holes C2 are grouped into a plurality of blocks, the third inner side walls 180a in the odd-numbered blocks of the odd-numbered lines have a slope gentler than that of the remaining fourth inner side walls 180b in the blocks. In this case, it is also preferred that the third inner side walls 180a in the even-numbered blocks of the even-numbered lines have a slope gentler than that of the remaining fourth inner side walls 180b in the blocks.

Also, the third inner side walls 180a in the even-numbered blocks of the odd-numbered lines may have a slope gentler than that of the remaining fourth inner side walls 180b in the blocks. Similarly, the third inner side walls 180a in the odd-numbered blocks of the even-numbered lines may have a slope gentler than that of the remaining fourth inner side walls 180b in the blocks.

Hereinafter, a method for manufacturing the liquid crystal display device having the above-described configuration in accordance with an embodiment of the present invention will be described in detail. FIGS. 10A to 10G are sectional views respectively illustrating sequential processes of a liquid crystal display device manufacturing method according to an embodiment of the present invention.

Figure 10A:
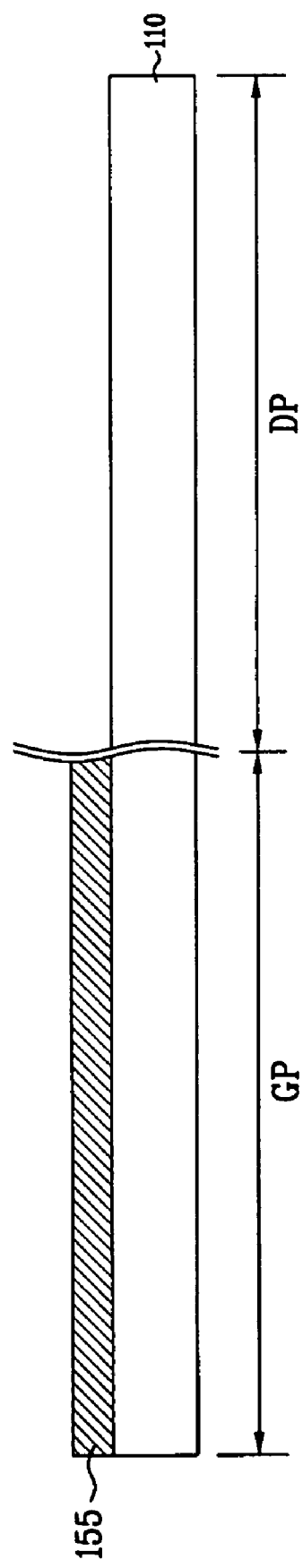

In accordance with the method, as shown in FIG. 10A, a substrate 110 is first prepared, in which a gate pad area GP, a data pad area DP, and pixel regions are defined. A metal layer is deposited over the entire surface of the substrate 110. The metal layer is then patterned, using a photolithography process, to form gate lines extending in one direction in a display area, which includes the pixel regions, to form gate electrodes protruded from the gate lines at respective pixel regions, and to form gate pads 155 in the gate pad area GP.

Figure 10B:
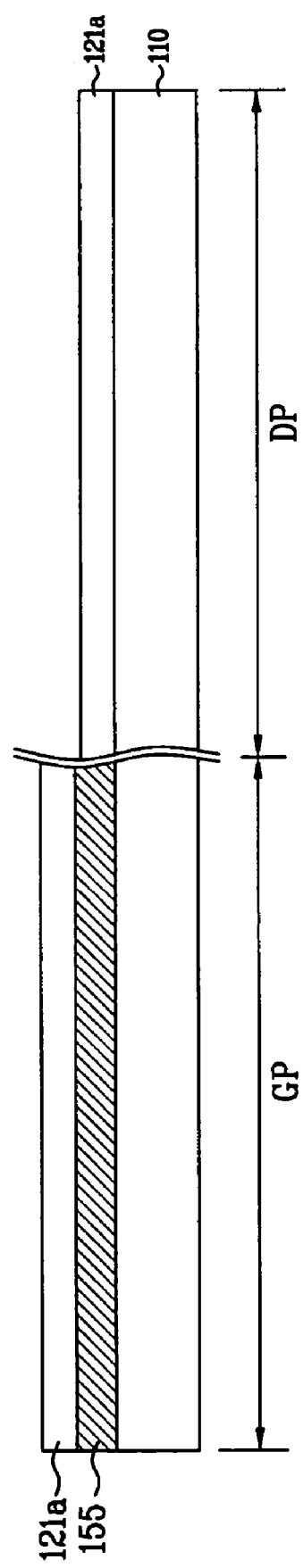

Thereafter, a gate insulating film 121a is deposited over the entire surface of the substrate 110 including the gate lines and gate pads 155, using an insulating material containing silicon oxide (SiOx) or silicon nitride (SiNx), as shown in FIG. 10B. Subsequently, although not shown, a semiconductor material such as unintentionally doped amorphous silicon and doped semiconductor material such as doped amorphous silicon are sequentially deposited on the gate insulating film 121a. The deposited semiconductor layers are then patterned using a photolithography process, thereby forming a semiconductor layer and an ohmic contact layer, in this order, on the gate insulating film 121a at a region over each gate electrode.

Figure 10C:
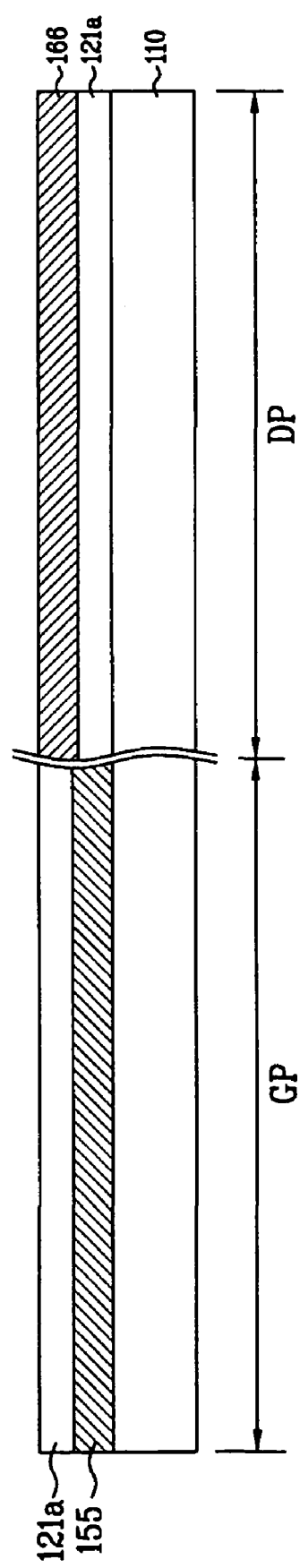

Next, a metal layer made of a metal such as chromium or molybdenum is deposited over the entire surface of the substrate 110 including the semiconductor layer and ohmic contact layer. The metal layer is then patterned using a photolithography process to form source and drain electrodes at opposite sides of each channel region of the semiconductor layer. Thus, TFTs are fabricated. Thereafter, formation of data lines, which extend in perpendicular to the gate lines and are connected to associated ones of the source electrodes of the TFTs, is carried out. Simultaneously, data pads 166 are formed on the gate insulating film 121a in the data pad area DP, as shown in FIG. 10C. At this time, the ohmic contact layer formed on the channel regions of the semiconductor layer is removed.

Subsequently, a protective layer 121b is deposited over the entire surface of the substrate 110 including the source electrodes, drain electrodes, data pads 166, and gate insulating film 121a, using an organic insulating film. The protective layer 121b and gate insulating film 121a are patterned using a photolithograph process to simultaneously form drain contact holes (not shown) for exposing the drain electrodes, gate contact holes ("C1" in FIG. 4) for exposing predetermined portions of the gate pads 155, and data contact holes ("C2" in FIG. 8) for exposing predetermined portions of the data pads 166.

Figure 10D:
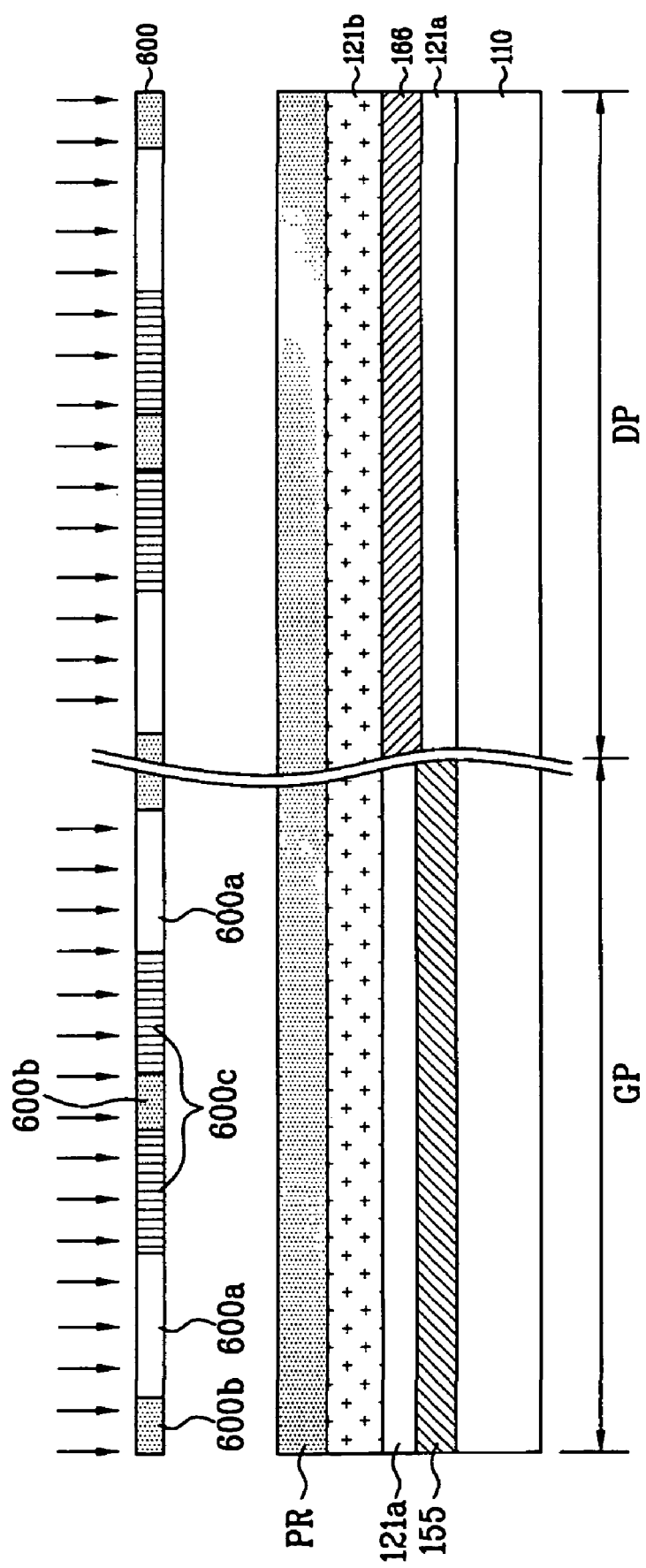

Hereinafter, a method for forming the gate contact holes C1 and data contact holes C2 will be described in detail. First, a photoresist PR is formed over the entire surface of the substrate 110 formed with the protective layer 121b, as shown in FIG. 10D. A diffraction mask 600, which includes transmission portions 600a, shield portions 600b and slits 600c, is then arranged above the photoresist PR in an aligned state.

Figure 10E:
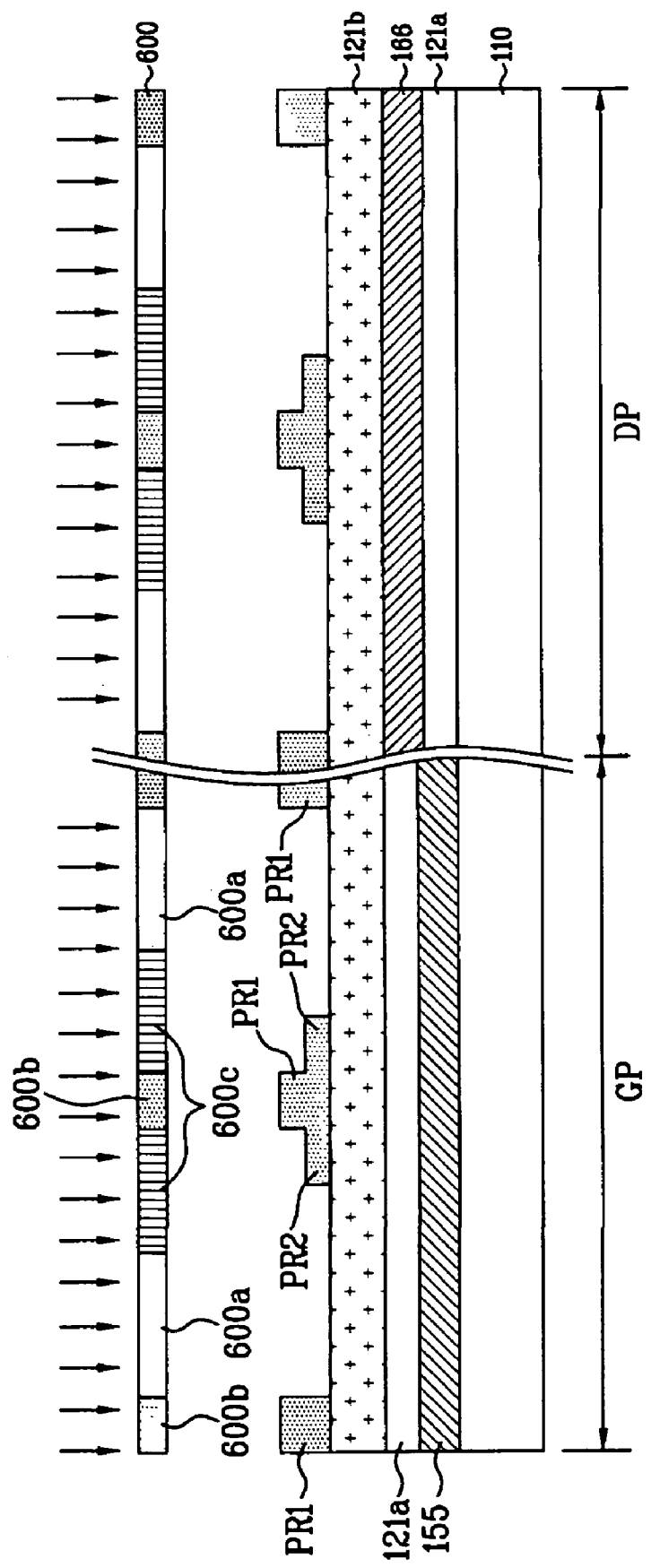

Thereafter, as shown in FIG. 10E, light exposure is carried out by irradiating ultraviolet rays to the photoresist PR under the condition in which the diffraction mask 600 is arranged above the photoresist PR in an aligned state. After development, the portion of the photoresist PR corresponding to each transmission portion 600a of the diffraction mask 600 is completely removed. At this time, none of the portion of the photoresist PR corresponding to each shield portion 600b of the diffraction mask 600 is removed. On the other hand, approximately half of the portion of the photoresist PR corresponding to each slit 600c of the diffraction mask 600 remains.

Generally, the portion of the photoresist PR, approximately half of which remains, is called a "half-tone resist". For simplicity of description, the portion of the patterned photoresist PR, none of which is removed, will be referred to as a "first photoresist PR1", and the haft-tone resist will be referred to as a "second photoresist PR2".

Using the first and second photoresists PR1 and PR2 as a mask, an etching process for the protective layer 121b and gate insulating film 121a is carried out, as shown in FIG. 10F. Generally, the etching process may be a wet etching process using a liquid etchant, or a dry etching process using a gas etchant.

In the etching process, the first and second photoresists PR1 and PR2, and the protective layer 121b exposed through the first and second photoresists PR1 and PR2 as the mask are etched at the same etching rate. That is, the etching of the portions of the protective layer 121b and gate insulating film 121a, which are not covered by the first and second photoresists PR1 and PR2 and arranged beneath the transmission portions 600a of the diffraction mask 600, begins simultaneously with the etching of the first and second photoresists PR1 and PR2 which are arranged beneath the shield portions 600b and slits 600c of the diffraction mask 600.

In the gate pad area GP, as shown in FIG. 10F, when the second photoresist PR2 arranged beneath each silt 600c is completely etched in the etching process, approximately half of the first photoresist PR1 arranged beneath each shield portion 600b remains. At this time, the portion of the protective layer 121b arranged beneath each transmission portion 600a is completely etched, and the portion of the gate insulating film 121a arranged beneath the completely etched portion of the protective layer 121b begins to be etched.

At the same time, in the data pad area DP, when the second photoresist PR2 arranged beneath each silt 600c is completely etched, approximately half of the first photoresist PR1 arranged beneath each shield portion 600b remains. At this time, the portion of the protective layer 121b arranged beneath each transmission portion 600a is completely etched, so that a predetermined portion of the data pad 166 formed beneath the completely etched portion of the protective layer 121b is exposed. Thus, a data contact hole C2 is formed. The data pads 166 are influenced by neither the liquid etchant nor gas etchant because the data pads 166 are made of metal.

As the etching process proceeds further, as shown in FIG. 10G, the portion of the gate insulating film 121a arranged beneath each transmission portion 600a in the gate pad area GP is completely etched, thereby forming a gate contact hole C1, through which a predetermined portion of the gate pad 155 arranged beneath the completely etched portion of the gate insulating film 121a is exposed.

After the above-described light exposure and etching processes, the insulating film (protective layer and gate insulating film) has inner side walls 170a and 170b defining each gate contact hole C1 in the gate pad area GP. In accordance with the light exposure and etching processes using the above-described diffraction mask 600, the first inner side wall 170a corresponding to each slit 600c of the diffraction mask 600 has a slope θ1 gentler than a slope θ2 of the remaining second side walls 170b.

Of course, the insulating film also has inner side walls 180a and 180b defining each data contact hole C2 in the data pad area DP, and the third inner side wall 180a corresponding to each slit 600c of the diffraction mask 600 has a slope θ3 gentler than a slope θ4 of the remaining fourth side walls 180b.

Thereafter, a transparent conductive film is deposited over the protective layer 121b and gate insulating film 121a formed with the gate contact holes C1 and data contact holes C2. The transparent conductive film is then patterned using a photolithography process to simultaneously form gate pad electrodes 301 electrically connected with respective gate pads 155, and data pad electrodes 401 electrically connected with respective data pads 166. Although not shown, pixel electrodes are formed at respective pixel regions, simultaneously with the formation of the gate pad electrodes 301 and data pad electrodes 401.

The liquid crystal display device and the method for manufacturing the same, which have been described, have various effects. That is, in the liquid crystal display device according to the present invention, the insulating film has inner side walls defining gate contact holes such that the inner side walls arranged between two adjacent gate contact holes have a slope gentler than that of the remaining inner side walls. Accordingly, it is possible to prevent formation of cracks at gate pad electrodes because the portions of the gate pad electrodes formed along the inner side walls having the gentler slope are bent gentler than the portions of the gate pad electrodes formed along the remaining inner side walls. Also, it is possible to prevent formation of cracks at data pad electrodes because the insulating film has inner side walls defining data contact holes such that the inner side walls arranged between two adjacent data contact holes have a slope gentler than that of the remaining inner side walls.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
a signal line and a signal line pad arranged on a substrate in one direction;
an insulating film on a surface of the substrate including the signal line and the signal line pad, the insulating film including at least one contact hole through which a predetermined portion of the signal line pad is exposed; and
a pad electrode formed on the insulating film, and electrically connected with the signal line pad via the at least one contact hole,
wherein the insulating film includes inner side walls defining the at least one contact hole, the at least one contact hole comprises at least one pair of adjacent contact holes, and the slope of the inner side walls between the adjacent contact holes is gentler than the slope of the at least one of the remaining inner side walls of the adjacent contact holes.

2. The liquid crystal display device according to claim 1, wherein the signal line includes a gate line or a data line.

3. The liquid crystal display device according to claim 1, wherein the pad electrode is made of a material identical to a material of a pixel electrode included in the liquid crystal display device.

4. The liquid crystal display device according to claim 1, wherein the at least one contact hole comprises a plurality of contact holes arranged along at least two parallel lines.

5. The liquid crystal display device according to claim 4, wherein, when the contact holes arranged along each of the at least two parallel lines are divided into a plurality of blocks each including a pair of adjacent contact holes, the slope of the inner side walls between the adjacent contact holes in each odd-numbered block along each odd-numbered line is gentler than the slope of the at least one of the remaining inner side walls of the adjacent contact holes.

6. The liquid crystal display device according to claim 4, wherein, when the contact holes arranged along each of the at least two parallel lines are divided into a plurality of blocks each including a pair of adjacent contact holes, the slope of the inner side walls between the contact holes in each even-numbered block along each even-numbered line is gentler than the slope of the at least one of the remaining inner side walls.

7. The liquid crystal display device according to claim 1, wherein the contact hole has a square shape.

8. A liquid crystal display device comprising:
a gate line and a gate pad formed on a substrate;
a gate insulating film formed on the substrate including the gate line and the gate pad;
a data line and a data pad formed on the gate insulating film;
a protective film formed over a surface of the substrate including the data line and the data pad;
at least one first contact hole in the gate insulating film and the protective film, and at least one second contact hole formed in the protective film, to expose predetermined portions of the gate and data pads, respectively; and
a first pad electrode and a second pad electrode connected to the gate and data pads via the at least one first contact hole and the at least one second contact hole, respectively,
wherein each of the at least one first contact hole and the at least one second contact hole includes inner side walls and comprises at least one pair of adjacent contact holes and
wherein the slope of the inner side walls between the adjacent contact holes is gentler than the slope of the at least one of the remaining inner side walls of the adjacent contact holes.

9. The liquid crystal display device according to claim 8, wherein each of the at least one first contact hole and the at least one second contact hole comprises a plurality of contact holes arranged along at least two parallel lines.

10. The liquid crystal display device according to claim 9, wherein, when the contact holes arranged along each of the lines are divided into a plurality of blocks each including a pair of adjacent contact holes, the slope of the inner side walls arranged between the contact holes in each odd-numbered block on each odd-numbered line is gentler than the slope of the at least one of the remaining inner side walls.

11. The liquid crystal display device according to claim 9, wherein, when the contact holes arranged along each of the lines are divided into a plurality of blocks each including a pair of adjacent contact holes, the slope of the inner side walls arranged between the contact holes in each even-numbered block along each even-numbered line is gentler than the slope of the at least one of the remaining inner side walls.

12. The liquid crystal display device according to claim 8, wherein each of the at least one first contact hole and the at least one second contact hole has a square shape.

13. A method for manufacturing a liquid crystal display device, the method comprising:
forming a plurality of signal lines and a plurality of pads on a substrate;
forming an insulating film over a surface of the substrate including the signal lines and the pads;
forming at least one contact hole in the insulating film by exposing a predetermined portion of each of the pads such that the at least one contact hole comprises at least one pair of adjacent contact holes and each contact hole has at least one inner side walls, wherein a slope of the inner side walls between the adjacent contact holes is gentler than the slope of the at least one of the remaining inner side walls of the adjacent contact holes; and
forming a pad electrode to be connected with the pad via the at least one contact hole.

14. The method according to claim 13, wherein forming the at least one contact hole comprises:
forming a photoresist over a surface of the insulating film;
patterning the photoresist by exposure and developing processes using a diffraction mask; and
etching the insulating film by use of the patterned photoresist as a mask.

15. The method according to claim 14, wherein the diffraction exposure mask includes a transmission portion corresponding to the contact hole, a slit corresponding to the inner side wall having the gentler slope, and a shield portion corresponding to the remaining portion of the insulating film.

16. The method according to claim 13, wherein the at least one contact hole comprises a plurality of contact holes, and the slope of the inner side walls arranged between adjacent ones of the contact holes is gentler than the slope of the at least one of the remaining inner side walls.

17. The method according to claim 13, wherein the at least one contact hole comprises contact holes arranged along at least two parallel lines.

18. The method according to claim 17, wherein, when the contact holes arranged along each of the lines are divided into a plurality of blocks each including a pair of adjacent contact holes, the slope of the inner side walls arranged between the contact holes in each odd-numbered block along each odd-numbered line is gentler than the slope of the at least one of the remaining inner side walls.

19. The method according to claim 17, wherein, when the contact holes arranged along each of the lines are divided into a plurality of blocks each including a pair of adjacent contact holes, the slope of the inner side walls arranged between the contact holes in each even-numbered block along each even-numbered line is gentler than the slope of the at least one of the remaining inner side walls.

20. The method according to claim 13, wherein the at least one contact hole has a square shape.

* * * * *

UNITED STATES PATENT AND TRADEMARK OFFICE
CERTIFICATE OF CORRECTION

| | | |
|---|---|---|
| PATENT NO. | : 7,646,461 B2 | Page 1 of 1 |
| APPLICATION NO. | : 11/136321 | |
| DATED | : January 12, 2010 | |
| INVENTOR(S) | : Shin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this

Sixteenth Day of November, 2010

David J. Kappos
*Director of the United States Patent and Trademark Office*